United States Patent [19]

Grierson et al.

[11] Patent Number: 5,622,681
[45] Date of Patent: Apr. 22, 1997

[54] DIALYSIS SEPARATION OF HEAT STABLE ORGANIC AMINE SALTS IN AN ACID GAS ABSORPTION PROCESS

[75] Inventors: Jeffrey G. Grierson, Angleton; Kirby T. Rapstein, West Columbia, both of Tex.

[73] Assignee: The Dow Chemical Company, Midland, Mich.

[21] Appl. No.: 513,165

[22] Filed: Aug. 9, 1995

Related U.S. Application Data

[63] Continuation of Ser. No. 167,252, Dec. 14, 1993, abandoned, which is a continuation-in-part of Ser. No. 823,276, Jan. 21, 1992, abandoned.

[51] Int. Cl.$^6$ .......................... B01D 61/24; B01D 53/50; B01D 53/52; B01D 53/62
[52] U.S. Cl. .................. 423/228; 423/242.6; 423/242.7; 210/638
[58] Field of Search ..................................... 423/228, 229, 423/242.6, 242.7; 210/638

[56] References Cited

U.S. PATENT DOCUMENTS 2,680,116  6/1954  Frick et al. .............................. 546/243
2,702,801  2/1955  Donaruma et al. ...................... 540/534

(List continued on next page.)

FOREIGN PATENT DOCUMENTS 286143  10/1988  European Pat. Off. .
858397  12/1952  Germany .
742733  1/1956  United Kingdom .

OTHER PUBLICATIONS

Raipore Products Catalog, published by RAI Research Corp. of New York (undated).
K. N. Mani, "Electrodialysis Water Splitting Technology", published by Aquatech Systems of New Jersey (undated).
Jones et al., *J. Chem. Soc.*, (1952), pp. 3261–3264.
Drake et al., *J. Amer. Chem. Soc.*, 56, 697–700 (1934).
Sternberg et al., *J. Amer. Chem. Soc.*, 75, 3148–3152 (1953).
Horning et al., *Journal of the American Chemical Society* 74, 2680–1 (1952).
Shafer et al., *J. Amer. Chem. Soc.*, 74, 2012–15 (1952).
Kirk–Othmer *Encyclopedia of Chemical Technology*, vol. 2, pp. 295–299 (1978).
W. Theilheimer, *Synthetic Methods of Organic Chemistry*, vol. 13, p. 224, (1959).
W. Theilheimer, *Synthetic Methods of Organic Chemistry*, vol. 25, p. 215, (1971).
Kirk–Othmer *Encyclopedia of Chemical Technology*, vol. 12, pp. 692–711 (1978).
Kirk–Othmer *Encyclopedia of Chemical Technology*, vol. 7, pp. 397–405 (1979).
Kirk–Othmer *Encyclopedia of Chemical Technology*, vol. 4, p. 762 (1978).
"The Gas Conditioning Fact Book", Chapter 3, Dow Chemical Co., (1962).
Hess et al., *Chem.* 50, 385–9 (1917).
Treibs et al., *Chem. Ber.*, 89, 51–57 (1956).
Wladimir Dawydoff, *Chem. Tech.* (Berlin) 7, 647–655 (1955) (untranslated).

*Primary Examiner*—Michael Lewis
*Assistant Examiner*—Peter T. DiMauro

[57] ABSTRACT

There is disclosed an organic amine scrubbing process for acid gas abatement of gas streams. The process comprises Donnan dialysis of an absorbent solution to separate and convert organic amine heat stable salts back to free amine absorbent using an anion exchange or neutral membrane. The organic amine absorbent may be an alkanolamine, a substituted or unsubstituted 5–7 member heterocyclic amine or any organic amine suitable for acid gas scrubbing. There is also disclosed a dialysis cell comprising a two compartment cell separated by a membrane. The cell includes a charge of an organic amine high in the organic amine heat stable salt concentration in one compartment and a charge of a base solution in the other compartment. Also disclosed is a process for abating acid gases wherein the organic amine absorbent is regenerated by Donnan dialysis, and an apparatus for effecting the regeneration.

21 Claims, 3 Drawing Sheets

U.S. PATENT DOCUMENTS

| | | | |
|---|---|---|---|
| 2,768,745 | 10/1956 | Shapiro | 204/72 |
| 3,276,997 | 10/1966 | Reid | 210/638 |
| 3,427,206 | 2/1969 | Scardaville et al. | 429/144 |
| 3,556,965 | 1/1971 | D'Agostino et al. | 522/5 |
| 3,674,669 | 7/1972 | Tuwiner | 204/182.4 |
| 4,012,303 | 3/1977 | D'Agostino et al. | 521/27 |
| 4,107,005 | 8/1978 | D'Agostino et al. | 204/98 |
| 4,113,922 | 9/1978 | D'Agostino et al. | 429/33 |
| 4,230,549 | 10/1980 | D'Agostino et al. | 522/68 |
| 4,339,473 | 7/1982 | D'Agostino et al. | 427/495 |
| 4,414,090 | 11/1983 | D'Agostino et al. | 204/252 |
| 4,468,441 | 8/1984 | D'Agostino et al. | 429/105 |
| 4,530,704 | 7/1985 | Jones et al. | 95/180 |
| 4,543,169 | 9/1985 | D'Agostino et al. | 204/105 R |
| 4,559,144 | 12/1985 | Pfenniger et al. | 210/638 |
| 4,769,159 | 9/1988 | Igawa et al. | 210/638 |
| 4,783,327 | 11/1988 | Treybig et al. | 95/166 |
| 4,808,284 | 2/1989 | Bedell et al. | 204/72 |
| 4,814,051 | 3/1989 | Bedell et al. | 204/72 |
| 4,818,409 | 4/1989 | Puetter et al. | 210/638 |
| 4,859,437 | 8/1989 | Grinstead | 423/226 |
| 5,098,681 | 3/1992 | Christiansen et al. | 423/242.6 |
| 5,108,723 | 4/1992 | Chang et al. | 423/242.7 |
| 5,236,678 | 8/1993 | Chang et al. | 95/166 |
| 5,292,407 | 3/1994 | Roy et al. | 204/101 |
| 5,320,816 | 6/1994 | Tsai et al. | 423/243.07 |

DIALYSIS SEPARATION OF HEAT STABLE ORGANIC AMINE SALTS IN AN ACID GAS ABSORPTION PROCESS

CROSS-REFERENCE TO RELATED APPLICATION

This is a continuation of application Ser. No. 08/167,252, filed Dec. 14, 1993 now abandoned, which is a continuation-in-part of Ser. No. 07/823,276, filed Jan. 21, 1992, now abandoned.

FIELD OF THE INVENTION

The present invention relates to a process for dialysis regeneration of organic amine absorbents by removal of acid anions from heat stable organic amine salts in acid gas abatement systems.

BACKGROUND OF THE INVENTION

Organic amine absorbents are commonly utilized in heat reversible absorption processes to remove acid gases such as sulfur oxides ($SO_2$ and $SO_3$), hydrogen sulfide, carbon dioxide, carbonyl sulfide, and the like from gas streams, especially hydrocarbon gas streams. A thermal desorption step is typically used to regenerate the absorbent. Other acids present as a reaction byproduct, such as formic, sulfuric, thiocyanic, oxalic, hydrochloric, and the like, can complex with the amine to form heat stable organic amine salts (HSS) which are non-reversible under ordinary process desorption conditions. Such acids may be present in the gas as a minor component or may result from oxidation of the amine sorbent or the gas constituents. If not counteracted, the HSS impurity can increase in concentration and tie up available amine, impairing efficiency and increasing the corrosivity of the absorbent solution.

A caustic reclaimer unit may be suitable for regenerating certain organic amine sorbents such as monoethanolamine (MEA) from the HSS. The free MEA may be subsequently recovered from the caustic by distillation. Such reclaiming processes, however, are time consuming, not readily adaptable to on-site field operations and incur the costs of transporting spent absorbent solution to the site of the unit. Furthermore, amine sorbents other than MEA are generally heat sensitive and cannot be distilled following neutralization.

Organic amine sorbents can also be regenerated using limestone. The free amine is then separated from the solids by filtration. Limestone regeneration has defects similar to those of caustic reclaiming. In addition, filtration is messy and trace concentrations of CaOH in the process will cause precipitation and fouling in the absorber.

Alternatively, it is known that organic amine absorbents may be recovered from the HSS by electrodialysis action as in U.S. Pat. Nos. 4,814,051 and 4,808,284 to S. Bedell et. al. Both of these patents disclose the use of a simple two compartment electrodialysis cell in acid gas conditioning processes utilizing amines. In the cell, an electric field effects separation of the HSS anions across an anionic selective membrane into the anode compartment and neutralization of the cations in the cathode compartment.

U.S. Pat. No. 2,768,945 to Shapiro discloses a method for separating acidic gases from a fluid mixture by aqueous amine absorption. A partial electrolytic purification of the amine solution recycled from the regeneration step to the absorption step is said to prevent the accumulation of strong non-volatile acids.

Dialysis generally refers to processes wherein aqueous solutions of organic or inorganic acids or bases are produced by diffusion across a membrane of specific selectivity as disclosed, for example, in U.S. Pat. No. 4,818,409 by Puetter, et al. Electrodialysis is known in the art to include an applied electric field to effect diffusion. Donnan dialysis, on the other hand, is a non-electrodialysis process based on the Donnan exclusion principle wherein an ion exchange across the membrane occurs. Diffusion of a dialyzer ion species is concentration driven whereupon diffusion of an exchanging ion species is driven by the principles of electroneutrality and conservation of charge across the membrane.

The primary problem associated with dialysis separation is the difficulty of operating such processes efficiently. Mass transfer must be adequate for the species to be separated; otherwise, the required time and membrane area become unreasonably great. Also, the mass transfer rate for the product species must be low to avoid product losses into the neutralizing solution.

The use of anionic, cationic, or non-ionic (neutral) membranes to effect various dialysis processes are described in the RAIPORE Products Catalog distributed by RAI Research Corp. of New York. Dialysis is said to be useful in desalting applications, in reaction rate and pH control, in toxic anion or trace metal ion removal, in sensors, in bioreactors and in water treatment processes.

An electrodialysis process is described in a paper by K. N. Mani, available from Aquatech Systems of New Jersey, entitled "Electrodialysis Water Splitting Technology." Various anionic, cationic and bipolar membranes are disclosed to concentrate ions in solution and convert such ions into the acid or base. In this process, dialysis is driven by an electrical potential and water is split.

U.S. Pat. Nos. 4,543,169; 4,414,090; 4,230,549; 4,107,005; 3,674,669; 3,427,206; 4,468,441; 4,339,473; 4,113,922; 4,012,303; and 3,556,965 assigned to RAI Research Corp. disclose various aspects of the manufacture and use of dialysis membranes.

In commonly assigned U.S. Pat. No. 5,236,678, there is described a process for organic amine absorption of an acid gas such as $SO_2$ by an aqueous solution of a compound represented by the formula:

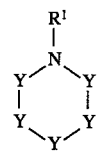

wherein each Y is independently $-(CR^2_2)-$, $-(CR^2)=$ or $-(C=O)-$ and each $R^1$ and $R^2$ is independently hydrogen, an alkyl group; a hydroxyalkyl group; an aldehyde group; a carboxylic acid group or salt thereof; an alkyl group containing at least one carboxylic ester, a carboxylic acid or salt thereof, ether, aldehyde, ketone, or sulfoxide group; wherein the compound has at least one carbonyl group. Representative of such absorbents are 2-piperidone and ethyl piperidone 2-carboxylate.

In commonly assigned U.S. Pat. No. 5,098,681 there is described a process for organic amine absorption of an acid gas such as $SO_2$ by an aqueous solution of a compound represented by the formula:

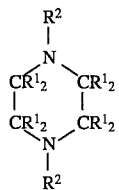

wherein each $R^1$ or $R^2$ is independently hydrogen; an alkyl group; a hydroxyalkyl group; an aldehyde group; a carboxylic acid or salt group; an alkyl group containing at least one carboxylic ester, carboxylic acid or salt, ether, aldehyde, ketone or sulfoxide; and wherein at least $R^1$ or $R^2$ is a carbonyl-containing group, such as an aldehyde group, a carboxylic acid containing group, a carboxyl ester group, or a ketone-containing group; or

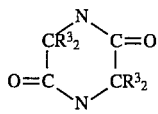

wherein each $R^3$ is independently hydrogen; an alkyl group; a hydroxyalkyl group; an aldehyde group; a carboxylic ester, a carboxylic acid or salt, ether, aldehyde, ketone or sulfoxide group. Representative of such absorbents are ethyl-1-piperazine carboxylate, 1,4-diformyl piperazine, 1-succinyl piperazine, glycine anhydride, and 1,4-dimethyl-2,5-piperazinedione.

In commonly assigned application Ser. No. 927,584, filed Aug. 10, 1992, now U.S. Pat. No. 5,342,593, entitled "Process for Absorption of Sulfur Compounds from Fluids" (applicants Steven H. Christiansen, Dane Chang and David A. Wilson), there is described a process for organic amine absorption of an acid gas such as $SO_2$ by an aqueous solution of a compound represented by the formula:

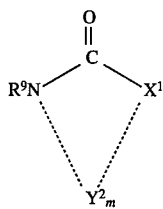

wherein $X^1$ is —O—, —$NR^1$—, or —N=; each $Y^2$ is independently —($CR^2{}_2$)—, —(C=O)—, —O—, $NR^1$—, —N=, or —C($R^2$)=; each $R^1$ and $R^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer preferably of from 2 to about 4. Representative of such absorbents are hydantoin, $N^2,N^3$-dimethyl-propyleneurea, trialkyl-1,3,5-triazine-2,4,6(1H,3H,5H)-trione, and 2-oxazolidone.

In commonly assigned U.S. Pat. No. 5,108,723 there is described a process for organic amine absorption of an acid gas such as $SO_2$ by an aqueous solution of a compound represented by the formula:

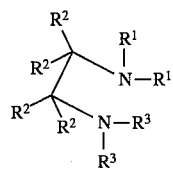

wherein each $R^1$, $R^2$ or $R^3$ is independently hydrogen; an alkyl group; a carboxylic acid group; a hydroxyalkyl group; an aldehyde group; or an alkyl group containing a carboxylic ester, a carboxylic acid or salt, ether, aldehyde, ketone or sulfoxide group; wherein at least one of $R^1$ and $R^3$ is a carboxymethyl group and at least one of $R^1$ and $R^3$ is hydrogen, preferably at least one $R^1$ is carboxymethyl and at least one R3 is hydrogen. Representative of such absorbents is symmetrical ethylenediaminediacetic acid.

SUMMARY OF THE INVENTION

A process has been discovered for using Donnan dialysis to efficiently separate the inorganic anion portions of heat stable organic amine salts (HSS) from the organic amine portion so as to produce a regenerated organic amine absorbent. The heat stable organic amine salts are formed as a byproduct in a process for abating acid gases such as $SO_2$, $H_2S$ and $CO_2$, from gas streams. A dialysis cell utilizing a membrane separates heat stable organic amine salts from the free amine and converts such salts back into amine sorbent without application of an electric field. Donnan dialysis proceeds at an efficient flux rate with relatively little product loss into a base dialyzing solution. Suitable exchange membranes preferably comprise anion exchange membranes resistant to hydroxyl and/or carbonate and/or bicarbonate anions. Anionic exchange membranes may be made, for example, by radiation grafting an inert polymer substrate with a hydrophilic monomer, and then preferably converting the grafted product to the cation.

In one embodiment, the invention provides a method for converting heat stable organic amine salts to a free amine absorbent for acid gases. The method includes feeding an absorbent solution containing heat stable organic amine salts into a first compartment of a dialysis cell, wherein the feed solution in the first compartment is separated from an aqueous alkaline dialyzing solution such as, for example, an aqueous hydroxide or carbonate or bicarbonate solution, or mixtures thereof, in a second compartment by an ion exchange membrane; inducing exchange of heat stable organic amine salt anions in the first compartment for hydroxyl, carbonate or bicarbonate anions in the second compartment by maintaining an effective concentration of an alkaline solution in the second compartment to regenerate free amine in the first compartment; and removing regenerated absorbent from the first compartment which has a reduced organic amine salt concentration and an enhanced free amine concentration.

In a preferred embodiment, the membrane is an anion exchange membrane comprising a polymer substrate radiation grafted with hydrophilic monomers. The substrates comprise homopolymers and copolymers of ethylene, propylene, and fluorinated ethylene and propylene monomers and the grafted monomers are selected from the group consisting of vinyl pyridine, styrene, vinyl acetate, acrylonitrile, acrylic acid and methacrylic acid. The grafted membranes are preferably converted to cation sites.

The base solution is preferably maintained at an alkaline concentration of between about 0.05 to about 20 percent by weight of the aqueous solution, preferably from 0.1 to 10 percent by weight.

The heat stable organic amine salt concentration is preferably from about 0.5 to 10.0 percent by weight, and more preferably from 2.0 to 5.0 percent by weight. When reference herein is made to the percent by weight of the HSS, it represents that percent by weight portion of the solution that is organic amine absorbent, i.e. that portion of the solution that is amine absorbent tied up as a part of the heat stable salt, for example, five percent by weight of the HSS solution actually denotes that portion of the solution that represents the organic amine, i.e. a five percent by weight HSS solution is representative of five grams of organic amine absorbent out of 100 grams of solution.

The higher heat stable salt organic amine concentration, i.e. 10 percent could require proportionately more organic amine in the solution to provide an adequate concentration of free organic amine that is required to perform the abatement function. The concentration of the organic amine is determined by the concentration of amine absorbent that is maintained as HSS. Typically, the organic amine concentration ranges from greater than about 0.5 percent by weight to less than 100 percent by weight, preferably from about 5 to 70 percent by weight, and more preferably from about 10 percent by weight to 60 percent by weight.

In another embodiment, the present invention provides a method for abating acid gases by contacting a gas stream containing an acid gas with an absorbent solution comprising an aqueous organic amine, preferably an alkanolamine or a 4-(2-hydroxyalkyl)-2-piperazinone (4-HEP), wherein the acid gas is absorbed by the organic amine and wherein a portion of the organic amine forms heat stable organic amine salts; heating the absorbent solution to thermally strip the acid gas from the solution; feeding at least a portion of the absorbent solution containing the organic amine salts into a first compartment of a dialysis cell, wherein the solution in the first compartment is separated from a second compartment by an anion exchange membrane; inducing exchange of organic amine salt anions in the first compartment for hydroxyl anions in the second compartment by maintaining an effective concentration of an alkaline solution in the second compartment to regenerate free amine in the first compartment; and recycling the regenerated absorbent which has a reduced organic amine salt concentration and an enhanced free amine concentration to the contacting step.

In a further embodiment, the present invention comprises an apparatus for converting heat stable organic amine salts to free amine. The apparatus comprises a dialysis cell having first and second compartments; an anion exchange membrane separating the compartments; a charge of organic amine absorbent solution containing heat stable organic amine salts in the first compartment, and a charge of an aqueous alkaline solution in the second compartment.

Figure 3:
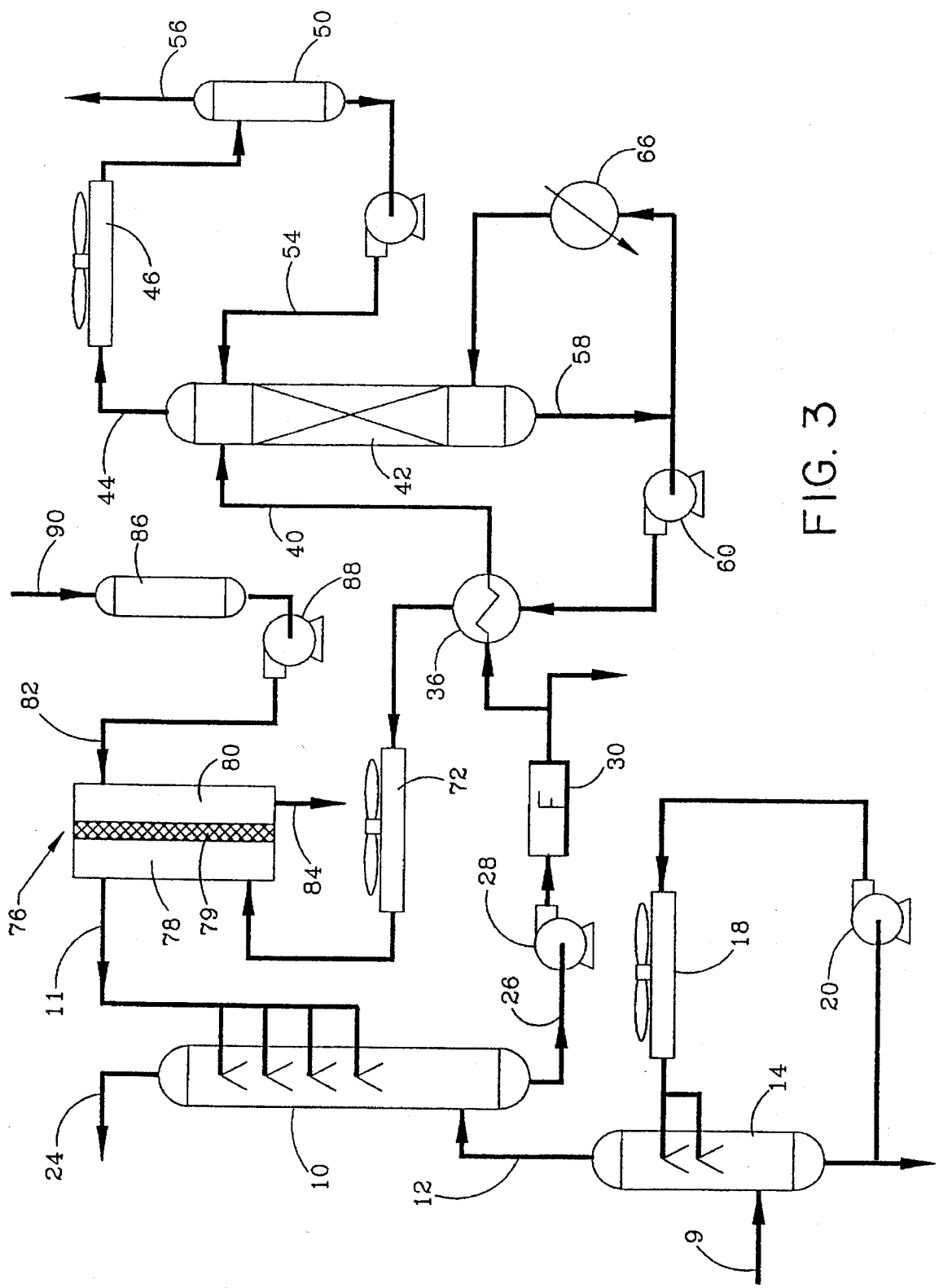
FIG. 3 represents a schematic diagram of an amine acid gas abatement process of the present invention.

First, with particular reference to FIG. 3, there is illustrated an embodiment of a flow chart in which an acid rich gas stream 12 enters an absorber column 10 in countercurrent flow with a regenerated organic amine absorbent 11 at a temperature of from about 15° C. to about 72° C. The inlet acid rich gas stream 9 can be initially cooled (if necessary) in a contacting vessel 14 by a closed loop water quench comprising a pump 20 and cooler 18. A purified or acid lean product gas stream 24 exits the absorber 10. The absorber column 10 may be packed with packing shapes, utilize a spray design or contain trays of appropriate spacing as is known in the art. An acid rich amine absorbent stream 26 is pumped from absorber column 10 by a pump 28 through a filter 30 wherein any accumulated particulate matter may be removed. After heating by a cross heat exchanger 36, the acid rich amine absorbent stream 40 is fed to a stripper column 42 in countercurrent flow where it is separated into an acid gas and a lean amine absorbent which contains heat stable salts. The stripper column 42 desorbs the acid gas, regenerating that portion of the absorbent for reuse in acid gas absorption. A portion of a lean acid absorbent stream 58 is contacted with steam generated by a reboiler 66 and recycled to the stripper column 42. A stripper overhead stream 44 comprising the acid gas and steam from the reboiler 66 is cooled by heat exchanger 46 to condense the steam. An acid gas stream 56 is separated from condensables in separator 50 for disposal or further processing and the condensables stream 54 is refluxed into the stripper column 42. A portion of the lean acid amine absorbent stream 58, containing heat stable organic amine salts, is taken off of stripper column 42 by means of pump 60 and is cooled to a temperature of from about 5° C. to about 60° C. in the crossheat exchanger 36 and a cooler 72 and a portion is taken to a dialysis cell 76 to maintain the heat stable organic amine salt concentration of the absorbent at a predetermined level or concentration by removing a fraction of the HSS. The dialysis cell 76 has a feed compartment 78 and a dialyzing compartment 80 separated by a membrane 79, preferably by an anion exchange membrane. In the feed compartment 78, an absorbent solution containing the HSS has a fraction of the HSS removed by dialytic diffusion across the membrane 79 into the dialyzing compartment 80 leaving a regenerated absorbent behind to exit the cell 76 at 11. A tank 86 having an alkaline makeup stream 90 and pump 88 circulates a stream 82 through the dialyzing compartment 80. Typically, the alkaline flow through the dialyzing compartment 80 is controlled by the solution pH. A waste alkaline stream leaves the compartment 80 via conduit 84. The regenerated absorbent stream 11 having a reduced HSS concentration is recirculated into contact with the acid rich gas stream 12 in the absorber column 10.

DETAILED DESCRIPTION OF THE INVENTION

The present invention provides a process for abating acid gases from hydrocarbon, refining, flue, coal gasification or other gas streams using a thermally regenerable organic amine absorbent solution. The HSS concentration must be maintained at or less than a selected concentration in order to maintain the process equipment and efficiency.

Refinery gas and natural gas contain $CO_2$ and $H_2S$ which are undesirable elements to have in gas streams that are combusted. Alkanolamines are a class of compounds that are used in process applications to scrub or "sweeten" (i.e. to remove $CO_2$ and $H_2S$) refinery and natural gas streams. Monoethanolamine (MEA) and methyldiethanolamine (MDEA) are examples of such alkanolamine compounds. The absorption reaction by which the sweetening occurs is shown in equation 1 below.

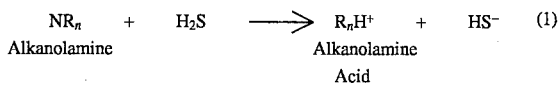

Over a period of time, scrubbing solutions containing alkanolamines like MDEA and MEA accumulate a number of anionic compounds ($X^-$) through degradation, absorption and side reactions that are not stripped off and removed from the solution in the desorption section of the process. Alkanolamine acids combine with these anionic compounds to form heat stable organic salts (HSS). These compounds accumulate in the process stream until such a high concentration is reached that corrosion and/or interference with the absorption process itself renders the stream unfit for further use. An example of the reaction route to produce HSS's is shown in the following equation.

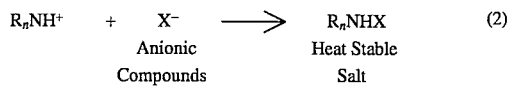

Where examples of $X^-$ include: $Cl^-$, $SO_4^{--}$, $SCN^-$ (thiocyanate), $S_2O_3^{--}$ (thiosulfate), $^-OOCCOO^-$ (oxalate), $HCOO^-$ (formate) and acetate.

Figure 4:
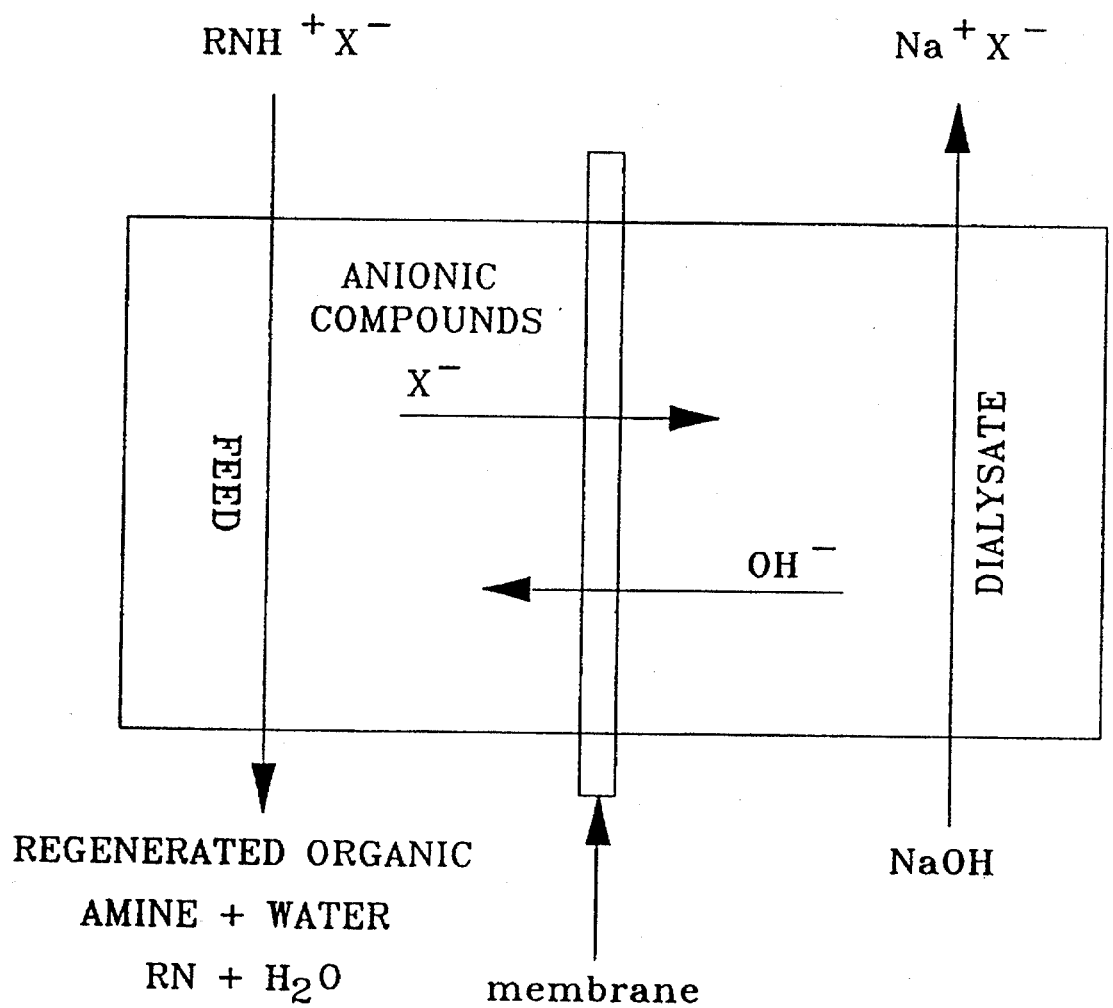
FIG. 4 is a graphic representation of one of the preferred dializing functions that takes place in a dializing cell.

One example of the present invention employs the use of an anion exchange membrane in a Donnan dialysis process to break the heat stable salts and separate the alkanolamines from the anionic compounds. As graphically illustrated in FIG. 4, a feed solution containing the heat stable salts is pumped to one side of the membrane while a dialysate solution of NaOH is pumped countercurrently to the other side. Donnan dialysis is a continuous membrane separation process based on the Donnan Exclusion Principle. This is a phenomena where co-ions (ions that have the same charge as the fixed charge sites in the membrane) are excluded from the membrane phase because of electronegative repulsion (non-ionic compounds are excluded according to size and solubility in the membrane phase), whereas counter-ions that have the opposite charge of the fixed charge sites are able to diffuse through the membrane. Since electronegative forces prevent the transfer of co-ions through the membrane, an equivalent amount of counter-ion charge must be transferred from both sides of the membrane in order to maintain electroneutrality. The separation process is therefor driven by the counter-ion concentration differentials and is possible due to high anionic and low cationic membrane permeabilities.

Thus when NaOH is used in the dialysate solution and spent alkanolamine solution containing heat stable salts is used as feed, $OH^-$ passes into the feed solution in exchange for heat stable salt anions which pass through the membrane in the opposite direction to maintain electroneutrality (see equation 1). While counter-ions are exchanged, virtually all of the $Na^+$ stays on its side of the membrane since co-ions (cations in this case) are excluded from the membrane phase. The $OH^-$ then will proceed to react with the alkanolamine acid to produce water and free alkanolamine as $NR_3$. The neutralization reaction is shown in equation 3.

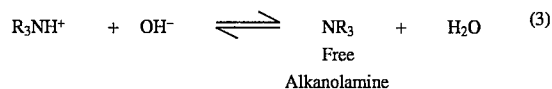

This process is continued until enough of the HSS anions are removed and free alkanolamine produced so that the solution can be effectively reused in a scrubbing application.

Alkanolamines have long been known as sorbents for scrubbing acid gases containing hydrogen sulfide, carbon dioxide, and other acid gases. Alkanolamines useful in the present invention include, for example, monoethanolamine, diethanolamine (DEA), methyldiethanolamine (MDEA), diisopropanolamine, diglycolamine, and the like.

Other amine absorbents suitable for absorbing acid gases such as $SO_2$ and $SO_3$ ($SO_x$) preferably comprise a five to seven member, substituted or unsubstituted nitrogen-containing heterocyclic ring compound. Piperazinone and morpholinone compounds are particularly preferred. Scrubbing with aqueous amines, such as piperazinone and morpholinone compounds, is known in the art, and is described, for example, in U.S. Pat. No. 4,530,704 to Jones et al. and U.S. Pat. No. 4,783,327 to Treybig et al., both of which are incorporated herein by reference.

Suitable piperazinone/morpholinone compounds have the general formula:

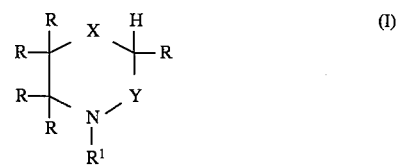

wherein X is oxygen or $-(NR^2)-$; Y is $-(CH_2)-$ or $-(C=O)-$; R is hydrogen, an alkyl group having from one to six carbon atoms or aryl or aralkyl group having from six to twelve carbon atoms; R1 is hydrogen, an alkyl or hydroxyalkyl group having from one to six carbon atoms, or an aryl or aralkyl group having from six to twelve carbon atoms; and $R^2$ is $R^1$, or preferably a 2-hydroxyethyl group of the formula:

wherein R3 is hydrogen or an alkyl group having one or two carbon atoms. Suitable 4-(2-hydroxyalkyl)-2-piperazinones include 4-(2-hydroxyethyl)-2-piperazinone (4-HEP), 4-(2-hydroxyethyl)-1-methyl-2-piperazinone, 4-2(2-hydroxyethyl)-3-methyl-2-piperazinone, 4-(2-hydroxyethyl)-5-methyl-2-piperazinone, 3-ethyl-4-(2-hydroxyethyl)-2-piperazinone, 3-ethyl-4-(2-hydroxyethyl)-2-piperazinone, 6-ethyl-4-(2-hydroxyethyl)-2-piperazinone, 4-(2-hydroxyethyl)-5,6dimethyl-2-piperazinone, 1-ethyl-4-(2-hydroxyethyl)-2-piperazinone, 4-(2-hydroxyethyl)-3-phenyl-2-piperazinone, 1,4-bis(2-hydroxyethyl)-2-piperazinone, 4-(2-hydroxyethyl)-2-piperazinone, 4-(2-hydroxypropyl)-2-piperazinone, 4-(2-hydroxybutyl)-2-piperazinone and 4-(2-hydroxypropyl)-6-methyl-2-piperazinone.

Preparation of the 4-HEP compounds useful in the invention is accomplished by reacting the appropriate 2-piperazinone or substituted derivative thereof with ethylene oxide or ethylene chlorohydrin. An improved method of preparation involves the reaction of an N-hydroxyalkylalkylenediamine with glyoxal or a substituted glyoxal. Details of this process are disclosed in commonly assigned application Ser. No. 085,428 filed Aug. 13, 1987, now U.S. Pat. No. 4,814,443, which is hereby incorporated herein by reference.

Another preferred class of $SO_2$ scrubbing amines includes piperidines having carbonyl groups, preferably compounds of the formula:

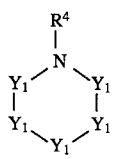

(III)

wherein each $Y^1$ is independently $-(CR^5_2)-$, $-(CR^5)=$ or $-(C=O)-$; and each $R^4$ and $R^5$ is independently hydrogen; an alkyl group; a hydroxyalkyl group; an aldehyde group; a carboxylic acid group or salt thereof; an alkyl group containing at least one carboxylic ester, a carboxylic acid or salt thereof, ether, aldehyde, ketone, or sulfoxide group; wherein the compound has at least one carbonyl group (a carbonyl-containing group), that is, at least one of $Y^1$ is $-(C=O)-$ and/or at least one $R^4$ or $R^5$ comprises $-(C=O)-$, e.g. as in an aldehyde-, ester-, carboxylic acid- (or salt), or ketone-containing group.

In each of the possible $R^4$ or $R^5$ groups, each alkyl group is of a size or molecular weight suitable for use in absorbing sulfur dioxide, in aqueous solutions. Preferably each such alkyl group, including the substituted groups such as hydroxyalkyl groups, have from 1 to about 12 carbon atoms, more preferably, from 1 to about 6 carbon atoms. Each alkyl group or alkyl portion of an aralkyl group is suitably cyclic, branched or unbranched, and optionally is at least partially unsaturated (alkylene), e.g. vinyl or allyl groups or substituents.

In Formula III each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, ester, acids, carboxylates and ketones; and sulfoxides.

Preferred substituents, $R^4$ and $R^5$ on compounds of Formula III are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl, or carboxylic acid or salt group, more preferably alkyl groups unsubstituted or having such substituents, most preferably alkyl groups having at least one hydroxyl group, that is hydroxyalkyl groups. When R or $R^5$ includes a salt, the salt suitably has any counterion which allows water solubility, preferably a metal cation, more preferably an alkali metal counterion, or mixtures thereof.

Preferred compounds among compounds of Formula III include piperidones and piperidines having at least one carbonyl-containing substituent on the ring nitrogen and/or on at least one ring carbon atom; compounds wherein $R^4$ is other than hydrogen, more preferably a carbonyl-containing group, most preferably a formyl or carboxylate group is on a carbon atom within one carbon atom from, more preferably adjacent to, the nitrogen atom; and compounds having more than one oxygen atom, more preferably more than one carbonyl oxygen. Formyl groups on the nitrogen atom generally enhance regenerability, while carboxylic acids and salts generally enhance absorption of $SO_2$.

Exemplary of compounds of Formula III are piperidines having a carbonyl group such as 2-piperidone; 1-methyl-2-piperidone; 3-carbethoxy-2-piperidone-piperidone; 4-piperidone; 1-acetyl-4-piperidone; 1-formyl piperidine; 1-formyl piperidone; ethyl piperidine-2-carboxylate; ethyl 1-piperidine propionate; 1-piperidine propionic acid; 3-hydroxy-2-piperidone; 2,4-piperidinedione; 3,3-piperidone hydrochloride; 1-piperidine carboxaldehyde; 4-piperidine carboxaldehyde; 2,2,6,6-tetramethyl-4-piperidone, and the like. Preferred compounds include 1-methyl-2-piperidone; 3-carbethoxy-2-piperidone; 1-acetyl-4-piperidone; 1-formyl piperidine; 1-piperidine propionic acid.

Such piperidones are commercially available and are known in the art. Piperidones are prepared by methods within the skill in the art, for instance by processes taught by Herning and Strombergin German Patent No. 858,397 (Dec. 8, 1952); *Journal of the American Chemical Society* 74, 2680–1 (1952); or by Vladimir Dabydovin, *Chem. Tech.* (Berlin) 7, 647–655 (1955), all involving rearrangement of certain oximes; U.S. Pat. No. 2,702,801 (Donaldson) teaching conversion of secondary nitrocompounds, e.g. nitrocyclopentane.

Piperidines having carbonyl-containing substituents on the ring nitrogen are commercially available, and are prepared by methods within the skill in the art, for instance by procedures such as those taught by Jones, et al. in *J. Chem. Soc.*, (1952), pp. 3261–3264, teaching the reaction of carbon dioxide and a pyridine to produce formyl piperidines; Hess, et al. in *Chem.* 50, 385–9 ;(1917) teaching synthesis of 2-piperidene carboxylate by oxidation of picoline with formaldehyde; Treibs, et al. in *Chem. Ber.*, 89, 51–57 (1956) teaching preparation of such compounds as 3-piperidinepropionate and methyl-2-piperidinopropionate by reaction of nitrite and bromo-substituted dicarboxylic acids via oximino and dioximino dicarboxylic acids; Drake, et al. in *J. Amer. Chem. Soc.*, 56,697–700 (1934) teaching preparation of alkyl-1-piperidinopropionate, e.g. by reaction of certain bromo substituted acrylic esters and piperidine; or Sternberg, et al. in *J. Amer. Chem. Soc.*, 75, 3148–3152 (1953) teaching preparation of N-formyl piperidine by reacting dicobalt octacarbonyl with piperidine in the presence of a Lewis base.

Piperidines having carbonyl-containing substitution on a ring carbon, as has 3-carbethoxy-2-piperidone are commercially available and are known in the art. They are prepared by methods known to persons skilled in the art, for instance by procedures such as those taught in U.S. Pat. No. 2,680,116 (Tricky et al.) which teaches treatment of such compounds as dioxodialkylpiperidines or derivatives thereof with formic acid esters followed by reduction to produce piperidine-diones; British Patent No. 742,733, (Roche Products, Ltd.) which teaches reaction of certain dioxodialkyltetrahydropyridines with formaldehyde and reduction to produce certain alkyltetrahydropyridinediones and alkylpiperidinediones; Shechter, et al. in *J. Amer. Chem. Soc.*, 74, 2012–15 (1952) and by Horning, et al. Ibid, pp. 2680–2681.

Another preferred class of $SO_2$ scrubbing amines includes piperazines having carbonyl groups, preferably compounds of the formula:

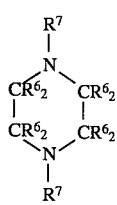

wherein $R^6$ and $R^7$ are independently hydrogen; an alkyl group; a hydroxyalkyl group; an aldehyde group; a carboxylic acid or salt group; or an alkyl group containing at least one carboxylic ester, carboxylic acid or salt, ether, aldehyde, ketone or sulfoxide; and wherein at least one $R^6$ or $R^7$ is a carbonyl-containing group, such as an aldehyde group, a carboxylic acid containing group, a carboxyl ester group, or a ketone-containing group.

In each of the possible $R^6$ or $R^7$ groups, each alkyl group is of a size or molecular weight suitable for use in absorbing sulfur dioxide in aqueous solutions. Preferably each alkyl group, including the substituted groups such as hydroxyalkyl groups, have from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula IV each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, ketones; and sulfoxides.

Preferred substituents, $R^6$ and $R^7$, on compounds of Formula IV are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxyalkyl groups. When $R^6$ or $R^7$ include a salt, the salt suitably has any counterion which allows water solubility, preferably a metal cation, more preferably an alkali metal counterion, or mixtures thereof.

Preferred compounds among compounds of Formula IV include piperazines having at least one carbonyl-containing substituent on the ring nitrogen and/or on at least one ring carbon atom; compounds wherein $R^7$ is other than hydrogen, more preferably a carbonyl-containing group, most preferably a formyl or carboxylate group; compounds in which at least one carbonyl group is on a carbon atom within one carbon atom from, more preferably adjacent to, the nitrogen; compounds having more than one oxygen atom, more preferably more than one carbonyl oxygen. Formyl groups on nitrogen generally enhance regenerability, while carboxylic acids and salts generally enhance absorption of $SO_2$.

Exemplary of the compounds of Formula IV are piperazines such as ethyl-1-piperazine carboxylate; 1,4-piperazine-dicarboxylic acid; 1-succinylpiperazine; 1-formylpiperazine; 1,4-diformyl-piperazine; 1-formyl-2-methylpiperazine; 1-formyl-2,5-dimethylpiperazine; 1-(2-hydroxyethyl)-4sulfoxyl-piperazine and the like. Preferred compounds include ethyl-1-piperazine carboxylate; 1,4-diformylpiperazine; and 1-succinylpiperazine.

Such piperazines are commercially available and are known in the art. They are prepared by methods within the skill in the art, for instance by processes taught in Kirk-Othmer *Encyclopedia of Chemical Technology*, vol. 2, pp. 295–299 (1978).

Another preferred class of $SO_2$ scrubbing amines include anhydrides of monocarboxylic amino acids (hereinafter anhydrides), preferably compounds of the formula:

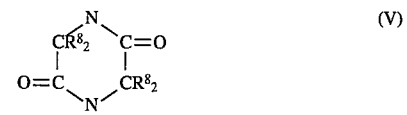

wherein each $R^8$ is independently hydrogen; an alkyl group; a hydroxyalkyl group; an aldehyde group; a carboxylic acid or salt group; or an alkyl, aryl, or aralkyl group containing at least one carboxylic ester, a carboxylic acid or salt, ether, aldehyde, ketones or sulfoxide group.

In each of the possible $R^8$ groups, each alkyl group is of a size or molecular weight suitable for use in absorbing sulfur dioxide in aqueous solutions. Preferably each alkyl group, including the substituted groups such as hydroxyalkyl groups, has from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula V, each alkyl group is unsubstituted or inertly substituted, that is substituted with groups which do not interfere undesirably with use of the compounds to absorb sulfur dioxide, with solubility of the compounds in water with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, salts and ketones; and sulfoxides.

Preferred substituents, $R^8$ on compounds of Formula V are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxyalkyl groups. Where $R^8$ includes a salt, the salt suitably has any counterion which allows water solubility, preferably a metal cation, more preferably an alkali metal counterion, or mixtures thereof.

Preferred compounds among compounds of Formula V include anhydrides produced from amine-containing acids, such as glycine anhydride, 1,4-dimethyl-2,5-piperazinedione and the like.

Exemplary of preferred anhydrides are 2,5-piperazinedione (glycine anhydride); 1-methyl-2,5-piperazinedione; 1,4-dimethyl-2,5-piperazinedione; 1-(2-hydroxyethyl)-2,5-piperazinedione; 1,4-bis(2-hydroxyethyl)-2,5-piperazinedione; 1-(2-hydroxyethyl)-4-methyl-2,5-piperazinedione; 4-(2-hydroxyethyl)-2,5-piperazinedione; 1-(2-hydroxyethyl)-3-methyl-2,5-piperazinedione; 1,3,4,6-tetramethyl-2,5-piperazinedione; 1-(2-hydroxyethyl)-3,3-dimethyl-2,5- piperazinedione; 1,4-bis(2-hydroxyethyl)-3,3-dimethyl-2,5-piperazinedione; 1-butyl-2,5-piperazinedione; 1,4-dibutyl-2,5-piperazinedione; 3,3'-dibutyl-2,5-piperazinedione and the like. Preferred compounds include 2,5-piperazinedione and 1,4-dimethyl-2,5-piperazinedione.

Such anhydrides are commercially available and are known in the art. They are prepared by methods known to persons skilled in the art, for instance by processes taught in *Synthetic Methods of Organic Chemistry*, W. Theilheimer, Vol. 13, p. 224 (1959).

Another preferred class of $SO_2$ scrubbing amines includes heterocyclic compounds having at least one ring nitrogen atom of the formula:

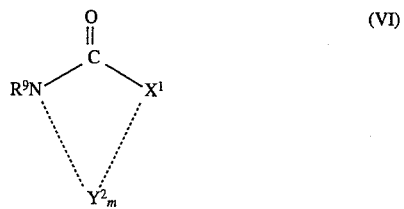

(VI)

wherein $X^1$ is —O—, —$NR^9$—, or —N=; each $Y^2$ is independently —$(CR^{10}_2)$—, —(C=O)—, —O—, —$NR^9$—, —N=, or —$C(R^{10})$=; each $R^9$ or $R^{10}$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group and m is an integer preferably of from 2 to about 4, more preferably from about 2 to about 3.

In each of the possible $R^9$ or $R^{10}$ groups, each alkyl group is of a size or molecular weight suitable for use in absorbing sulfur dioxide, preferably in aqueous solutions. Preferably each alkyl group, including the substituted groups such as hydroxyalkyl groups, have from 1 to about 12 carbon atoms, more preferably from 1 to about 6 carbon atoms. Each alkyl group is suitably cyclic, branched or unbranched and optionally is at least partially unsaturated (alkylene groups), e.g. vinyl or allyl groups or substituents.

In Formula VI each alkyl group is unsubstituted or inertly substituted, that is substituted with groups which do not interfere undesirably with use of the compounds to absorb sulfur dioxide, with solubility of the compounds in water or with regeneration of an aqueous solution of the compounds after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, carboxylate groups and ketones; and sulfoxides.

Preferred substituents, $R^9$ and $R^{10}$, on compounds of Formula VI are those which enhance solubility in water, preferably without decreasing the capacity for absorbing $SO_2$, the regenerability of the compound after absorption, or the chemical and heat stability under conditions of use. Preferred substituents are generally hydrogen or alkyl (or alkylene) groups and such groups having at least one hydroxyl group, carboxyalkyl groups or salts thereof, more preferably hydrogen, alkyl groups or alkyl groups having at least one hydroxy group, that is hydroxyalkyl groups, most preferably hydroxyalkyl groups. When $R^9$ or $R^{10}$ includes a salt, the salt suitably has any positive counterion which allowed solubility in watery preferably such a metal cation, more preferably an alkali metal counterion, or mixtures thereof.

Preferred compounds among compounds of Formula VI include hydantoins ($X^1$=$NR^9$—, and m=2), triazinones (of N-substituted isocyanuric acids) ($X^1$=—$NR^9$—, m=3, one of $Y^2$=—$NR^9$—), pyrimidinones ($X^1$=—$NR^9$—, m=3) and oxazolidones ($X^1$=O—, m=2), having indicated structure.

Among compounds represented by Formula VI, hydantoins are preferred because of their ready availability, ease of production from basic raw materials (like ammonia, hydrogen cyanide, carbon dioxide and ketones.

Exemplary of the hydantoins are hydantionitself; 5,5-dimethylhydantoin; N-methylhydantoin; N-butylhydantoin; N,N'-dimethylhydantoin; N-(2-hydroxyethyl)hydantoin; N,N'-bis(2-hydroxyethyl)-hydantoin; N-hydroxymethylhydantoin, N,N'-bis(hydroxymethyl)hydantoin, N-(2-hydroxyethyl)-5,5-dimethylhydantoin; N,N'-bis(2-hydroxyethyl)dimethylhydantoin; N-hydroxymethyl-5,5-dimethylhydantoin; N,N'-bis(hydroxymethyl)-5,5-dimethylhydantoin and the like. Preferred compounds include hydantoin 5,5-dialkylhydantoins such as 5,5-dimethylhydantoin; 5-ethyl-5-methylhydantion; and hydroxyalkylated hydantoins and derivatives thereof because such compounds exhibit good solubility, high regenerability, good thermal stability, low vapor pressure (high boiling point), and are readily available in commercial quantities.

Such hydantoins are commercially available and are known in the art. They are prepared by methods within the skill in the art, for instance by processes taught in Kirk-Othmer, *Encyclopedia of Chemical Technology*, Vol. 12, pp. 692–711 (1978).

Exemplary of the triazinones are 1,3,5-triazine-2,4,6-trione; trihydroxy-1,3,5-triazine-2,4,6-trione; trimethyl-1,3,5-triazine-2,4,6-trione; triallyl-1,3,5-triazine-2,4,6-trione and the like. 1,3,5-Tris(2-hydroxyalkyl)-2,4,6-triones, and the like are also suitably used. Triallyl-1,3,5-triazine-2,4,6-trione is preferred because of relatively high regenerability, good stability, and low vapor pressure (high boiling point).

Triazinones are commercially available and are known in the art. They are prepared by methods within the skill in the arty for instance by procedures such as those taught in Kirk-Othmer, *Encyclopedia of Chemical Technology*, Vol. 7, pp. 397–405 (1979).

Among compounds of Formula VI, pyrimidinones, including propyleneureas and pyrimidinediones, are preferred for their solubility in water. Exemplary of the propyleneureas are $N^1,N^3$-dimethylpropyleneurea; propyleneurea; $N^1$-methylpropyleneurea; $N^1,N^3$-dimethyl-propyleneurea; $N^1$-(2-hydroxyalkyl)propyleneurea; $N^1,N^3$-bis(2-hydroxyalkyl)propyleneurea; 4,6-dihydroxypropyleneurea; 4,5-dimethylpropyleneurea; 2,4-pyrimidinedione; and the like. $N^1,N^3$-Methylpropyleneurea is preferred because of relatively high regenerability, good thermal stability, and low vapor pressure. The structural representation of $N^1,N^3$-dimethylpropyleneurea is:

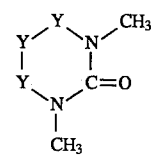

Pyrimidinones are known in the art. They are prepared by methods within the skill in the art, for instance by procedures such as those taught in Synthetic Methods of Organic Chemistry, W. Theilheimer, Vol. 25, pp 215, (1971).

Among compounds of Formula VI, oxazolidones including oxazolidinediones are preferred for their relatively high solubility as compared to other compounds having the same degree and type of substitution.

Exemplary of the oxazolidones are 2-oxazolidone; 3-methyl-2-oxazolidone; 5-methyl-2-oxazolidone; 3-(2-hydroxyethyl)-2-oxazolidone; 4,5-dimethyl-2-oxazolidone; 3-(2-hydroxyethyl)-4,5-dimethyl-2-oxazolidone; 2,4-oxazolidinedione; 5,5-dipropyl-2,4-oxazolidinedione and the like. 2-Oxazolidone is preferred because of relatively high regenerability, low vapor pressure (high boiling point) and good thermal stability.

Oxazolidones are commercially available and are known in the art. They are prepared by methods within the skill in the art, for instance by procedures such as those taught in Kirk-Othmer *Encyclopedia of Chemical Technology*, Vol. 4, pp. 762 (1978).

Amines are useful for absorbing acid gases at a concentration of from about 0.1 molar up to their saturation concentration in water. The process may be employed on a sour gas stream having an $SO_2$ or $H_2S$ concentration of from about 10 ppm up to about 45 percent by volume or greater.

Typically, and as seen in FIG. 3, the sour gas enters a liquid-gas contacting apparatus, such as for example, an absorber column or other conventional equipment. In the absorber column, the acid gases are absorbed into the amine solution in a manner described, for example, in "The Gas Conditioning Fact Book," Chapter 3, Dow Chemical Co., 1962 and other references known to the art. A purified "sweet" lower concentration $SO_2$ or $H_2S$ stream leaves the absorber column while the spent absorbent stream is sent to the stripping column for thermal regeneration.

The absorber column in the process of the invention may be operated at a temperature of from about 0° C. to about 120° C., but preferably at a temperature of from about 15° C. to about 72° C.

The absorbed acid gases are thermally stripped and the organic amine is regenerated for acid gas absorption by preferably passing steam through the spent absorbent solution in the stripping column. Thermal desorption of the absorbent takes place at any temperature below the thermal decomposition of the amine sorbent, preferably at a temperature of from about 75° C. to about 150° C., most preferably of from about 90° C. to about 120° C. In the overhead stream, condensables are returned to the stripper column and desorbed acid gases are removed for disposal or further treatment.

The absorber and stripping columns are typically operated at a pressure of from about atmospheric pressure to about 10 atmospheres. However, a pressure of about 1–2 atmospheres is preferred for the convenience of lower equipment and operating costs and reduced sorbent losses. Higher temperatures and pressures are not deleterious so long as they are below the decomposition temperature of the sorbent.

The absorbent solution or a portion thereof is circulated though the anionic dialysis cell for conversion of the amine-HSS back to free organic amine absorbent. The absorbent solution is preferably fed to the dialysis cell following desorption of the acid gases. Performing dialysis prior to stripping of the acid gases will result in removal of the non heat stable acids in the dialysis cell and thereby result in an inefficient process.

The process of organic amine acid gas abatement is based on the reversible nature or chemistry (absorption/desorption) of the amine-acid gas salts produced. However some anions present in the absorption solution form salt complexes with the amine which are not reversible by thermal desorption in the present process. Representative examples of anion species forming stable salts include sulfate, thiosulfate, chloride, oxalate, acetate, thiocyanate, formate, and the like. These salts can accumulate in the recirculating amine solutions and reduce the amount of free amine available for treating the acid gas.

In the practice of the present invention, Donnan dialysis is utilized to counteract the tendency for such amine-HSS species to accumulate by converting these salts back to free amine. Generally, an acceptable equilibrium concentration of amine-HSS in the recirculating absorbent solution is from about 0.5 to about 10.0 percent by weight of the aqueous solution.

The Donnan dialysis principle as mentioned previously is based on the Donnan exclusion principle wherein at least one charged species of a first electrolyte is excluded by a membrane separating a second electrolyte. By establishing a diffusion concentration gradient in a first non-excluded charge specie, a second non-excluded charge specie on the opposite side will be exchanged therefor because of the requirements of electroneutrality and conservation of electric charge on opposite sides of the membrane. When a charged membrane such as an anionic exchange membrane is utilized, positively charged species are excluded. A neutral membrane having a pore size suited for excluding the organic amine absorbent will allow transport of the second cation species in the alkaline solution on the opposite side of the membrane (unless it is also excluded by size) until an equilibrium is established.

When a charged membrane is utilized (e.g. an anion exchange membrane having cationic charge sites), like-charged cations in the solution are repulsed by the membrane and an exchange of anions across the membrane is permitted so that a neutral charge balance will be maintained. A non-equilibrium concentration is established in the base dialyzing solution such that anion exchange is promoted. The feed solution comprises the absorbent solution containing HSS and the base solution comprises a neutralizing aqueous alkaline solution containing any combination of hydroxyl, carbonate or bicarbonate anions. In one particular example, hydroxyl anions are exchanged across the membrane for the HSS anions. Stable acid anion impurities migrate into the base solution and are removed as, for example, an alkali metal salt. Hydroxyl anions migrate into the feed solution and neutralize HSS cations (the protonated amine) back to free amine. In such manner, the concentration gradient of hydroxyl anions is always positive and the co-exchange of opposite anions can be driven opposite an unfavorable concentration gradient. The free amine diffusion rate across the membrane into the base solution is relatively low. A dialysate solution containing a lower concentration of heat stable amine salts is then circulated back to the absorber. However, a neutral membrane which excludes the HSS cation can also be used. In this case, the opposite cation (e.g. Na+) establishes an equilibrium concentration on both sides of the membrane.

Dialysis cells utilized in the present invention, may have varying arrangements of compartments and membranes, as is known in the art, for bringing the base and feed solutions into the required membrane contact. One preferred configuration is a two-compartment cell separated by the anionic exchange membrane 79. In this type of cell, the feed solution undergoing dialysis is circulated through one compartment and the base solution is circulated through the other. Such cells can be used in a multiple stage series or parallel configuration. Another suitable configuration is the shell-and-tube design. In this type cell, the anion exchange membrane comprises hollow membrane fibers or tubes which are bundled together to provide a large surface area and compactness. The tube bundle is enclosed in the shell and the dialyzing solution can flow either through the interior or around the exterior of the fibers according to practitioner preference. General aspects of shell and tube design are well known in the art. In the present process, countercurrent flow is preferred for the dialyzing solutions. The only contact between fluids, in either configuration, is across opposing sides of the anion exchange membrane.

Selection of a suitable dialysis membrane permits efficient dialysis of the absorbent solution without the use of an electric potential to drive the diffusing species. The anion exchange membrane used in the dialysis cell of the present process preferably comprises a polymeric substrate radiation grafted with a hydrophilic monomer suitable for providing strong cationic sites on the membrane surface. Hydrophilic refers to those monomers which are hydrophilic or can be made hydrophilic by subsequent treatment such as quaternization, carboxylation, and the like Examples of suitable substrate materials include polyethylene, polypropylene, polytetrafluoroethylene, polysesquifluoro-propylene, ethylene-tetrafluoroethylene copolymer, fluorinated ethylene-propylene copolymer, and the like. For improved mechanical strength and oxidation, chemical and heat resistance, the polymer substrate may have varying degrees of crosslinking induced, for example, by irradiation.

Examples of hydrophilic monomers include vinyl pyridine, vinyl acetate, styrene, acrylonitrile, acrylic and methacrylic acid of which vinyl pyridine, acrylic and methacrylic acid are preferred.

The membrane may be further surface treated to convert the grafted functionality into cationic sites. For example, acrylic acid sites are converted to the corresponding alkali metal salt by treatment with dilute KOH and pyridine sites are quaternized to the pyridinium salt by treatment with methyl-, acetyl-, propyl- or butyl bromide. Alternatively, the hydrophilic monomer may be converted to its cationic form before radiation grafting. In this manner, quaternized vinyl pyridinium methyl iodide may be grafted directly onto the polymer substrate.

Other treatments may be employed to enhance surface wettability and reduce diffusion resistance including washing with a cationic surface-active emulsifier such as quaternary ammonium salts, non-quaternary nitrogen bases, and the like. One such emulsifier is stearyldimethylbenzylammonium chloride sold by Rohm and Haas Co. under the trade name TRITON X 400.

The grafted polymeric base may be supported and laminated to a polymeric cloth, woven mesh, perforated sheet, and the like support member which provides greater mechanical strength. Other aspects of the description and manufacture of suitable anionic membranes may be found is U.S. Pat. No. 4,230,549 and U.S. Pat. No. 4,339,473 to D'Agostino et al. which are incorporated herein by reference.

The anion exchange membrane of the present invention preferably has a thickness, when wet, of from about 0.01 mm to about 0.2 mm.

Anion exchange membranes found particularly responsive in the present invention include membranes sold under the trade designations RAIPORE R-1030 by RAI Research Corp. R-1030 is a thin tetrafluoroethylene-based polymer film of the strong anion exchange type having a wet thickness of about 0.05 mm.

A preferred neutral membrane is sold under the trade designation FILMTEC* NF-20. When a neutral membrane is used, the amine product is excluded from the membrane phase by size and solubility.

The dialysis process of the present invention may be conducted as a batch or continuous operation depending on the preference of the practitioner. The absorbent stream preferably has an HSS concentration of at least about 0.01 percent by weight of the stream, preferably from 0.5 to 10 percent by weight. In a batch design, absorbent solution is periodically removed for dialysis when HSS concentration becomes excessive, generally at an HSS concentration of from about 5 to about 10 percent by weight. In the continuous design, the dialysis unit is designed to accommodate the required absorbent flow rate for a required acid gas scrubbing rate and a desired HSS equilibrium concentration. Typically, HSS equilibrium concentration is held from about 0.5 to about 10 percent, preferably from 2 to 5 percent by weight of the solution.

For optimal operation of the dialysis of the present process, pressure is preferably atmospheric to about 10 atmospheres and the cell operating temperature is preferably from about 5° C. to about 60° C. The temperature should not be so great as to structurally compromise the membrane and preferably is lower than the boiling temperature of the absorbent solution.

The base solution comprises, for example, an aqueous alkali metal, alkaline metal, or ammonium type base dializing hydroxide solutions. Examples include potassium hydroxide, sodium hydroxide, sodium carbonate, ammonium hydroxide, calcium hydroxide, magnesium hydroxide, and the like. Dialysis rates depend in part upon base concentration which is typically maintained between about 0.05 to about 20 percent by weight of the aqueous solution, preferably between about 0.1 and about 10 percent by weight. If the base concentration is too low, the rate of dialysis will be undesirably low. On the other hand, if the base concentration is too high, the operating life of the membrane may be impaired when hydroxide bases are used and organic amine absorbent losses may be greater as is shown in the following examples.

The following examples illustrate the use of the dialysis process of the present invention:

EXAMPLES 1–4

In the following examples, dialysis was performed on an MDEA solution containing heat stable amine salt (HSS) in a static dialysis cell. The dialysis performance on HSS for two different membranes was measured and the effect of base solution concentration was also tested. Success of the results was determined by comparing final HSS concentration versus MDEA losses into the base solution.

The cell comprised a feed compartment and base compartment separated by the membrane disposed therebetween. The cell was rectangularly shaped and split longitudinally into two flanged sections. The membrane was framed by VITON gaskets on both sides, sandwiched and bolted between the compartment halves. Adjacent opposite sides of the membrane, the solution in one compartment was isolated from the solution in the other except for diffusional transport across the membrane. The compartments each had one feed and one vent tube on the top side.

In each test run, the feed compartment was filled with 320 g of MDEA/HSS solution containing 11 weight percent MDEA heat stable salts. The base compartment was filled with 1000 g of NaOH solution. Effective surface area of the membrane was 0.0223 $m^2$ (0.24 $ft^2$)

During the tests, the cell was placed on an orbital shaker to provide mixing. The tests lasted 24 hrs. Afterwards, the solutions were weighed and analyzed. Free MDEA concentration was determined by gas chromatography (GC) and the HSS concentration was determined as the weight percent of MDEA tied up as HSS, i.e. protonated MDEA cation, by ion chromatography (IC). In addition, the true weight of the compartment solutions was corrected for water transport across the membrane by osmosis.

Results in Table 1 indicate that all 4 examples were successful in separating the MDEA from the HSS to varying degrees. Results from Examples 2–4 indicate that lower hydroxide concentration reduced product losses with only minor reductions in HSS removal rate.

TABLE 1

| EX- AMPLE | MEMBRANE TYPE | NAOH CONC. (WT %) | CONC. REDUCTION IN THE FEED (%) | |
|---|---|---|---|---|
| | | | MDEA | HSS |
| 1 | R-1030 | 15 | 14.0 | 98.5 |
| 2 | NF-20 | 15 | 2.10 | 18.4 |
| 3 | NF-20 | 5 | 0.76 | 15.5 |
| 4 | NF-20 | 2 | 0.74 | 13.9 |

EXAMPLES 5–9

In the following examples, dialysis was performed on an MDEA solution containing heat stable amine salt (HSS) in a dynamic countercurrent cell. The dialysis performance on HSS removal for various membranes was measured utilizing two and five percent by weight sodium hydroxide concentrations. The test equipment consisted of nearly identical closed loop recirculation systems entering opposite ends of adjacent chambers of the cell. The compartments were isolated by the membrane having opposing sides in continuous contact with the solution streams. Each recirculation system consisted of a tank feeding a pump. The pump inlet line was temperature controlled by a jacket heat exchanger and water bath. The dialysis cell comprised a shallow depth rectangular chamber longitudinally split into two plate-like flanged sections. The membrane was framed on its outer edges on both sides by VITON gaskets and was bolted between the cell halves. At opposite ends of each compartment were inlet and outlet connections for the feed and base streams so that flow through the cell would be countercurrent. The only contact between the two streams was diffusional transport across the membrane.

Five tests were performed on four different membranes using either two or five weight percent NaOH dialyzing solution. Initial samples were taken before charging the respective tanks. The feed tank was filled with 1000 g of MDEA/HSS feed solution 11 weight percent MDEA in HSS and the base solution tank was filled with 1100 g of hydroxide solution before each run. Membrane surface area was 0.026 m$^2$ (0.28 ft$^2$). The base and feed solutions were each circulated at one liter per minute for five hours at 172.5 kPa gauge (25 psig) at a controlled temperature of 44° C. (111° F.). In addition to the initial samples taken, 30 g samples were taken from each stream ½ and one hour into every run and hourly thereafter until completion. Afterwards, final samples were taken from both sides. During the tests, a total of five samples were taken with an eventual reduction in the streams by 150 g per side at the end.

Samples were analyzed as described in Examples 1–4 except that the IC analysis included both the concentration of the protonated MDEA cation and the various HSS anions (i.e. formate, oxalate, Cl$^-$, SO$_4^=$, SCN$^-$ and S$_2$O$_3^=$). Note: the MDEA/HSS feed solution was spent absorbent solution from an actual acid gas scrubbing operation.

Results in Table 2 show the weight percent reduction of free MDEA (product loss) and HSS reduction in the feed solution. The data are corrected for water transport as in Table 1.

TABLE 2

| EX- AMPLE | MEMBRANE TYPE | NAOH CONC. (WT %) | CONC. REDUCTION IN THE FEED (%) | |
|---|---|---|---|---|
| | | | MDEA | HSAS |
| 5 | R-1030 | 2 | 0.01 | 18.6 |
| 6 | R-1030 | 5 | 1.20 | 25.7 |
| 7 | R-5030 | 2 | 5.37 | 12.8 |
| 8 | ADM-4000 | 2 | 18.7 | 29.2 |
| 9 | NF-20 | 2 | 0.17 | 4.60 |

Evaluation of the results in Tables 1 and 2 indicate that the RAIPORE R-1030 membrane from Rai Research Corp. gave the best separation results overall for the HSS while minimizing product losses. The FILMTEC* NF-20 membrane, while capable of being utilized, would require greater membrane surface area.

EXAMPLES 10–11

In the following examples, batch kinetic factors were determined by simulating a two stage batch dialysis of a MDEA/HSS absorbent utilizing the equipment from Examples 5–9. The membrane used was the R-1030, base solution concentration was either two percent or 0.5 percent NaOH by weight and the feed concentration was held constant. The spent absorbent contained from about 11 to about 12 percent by weight heat stable MDEA salts with anions such as formate, chloride, sulfate and oxalate. The membrane surface area was 0.026 m$^2$.

A run was begun by charging the feed tank with 1200 g feed solution and the base tank with 1200 g hydroxide with samples taken initially for analysis. Process temperature and pressure for each stream were identically maintained at about 32° C. and between about 28 to 55 kPa gauge (4 to 8 psig).

To simulate a two stage caustic process, the first batch stage was operated for a 4 hr time period after which the spent caustic solution was removed and refreshed by new solution of the same concentration and weight as initially used, then the "second" stage was operated for 4 hrs to complete the run. Samples were taken for analysis from both sides at the time of refreshment and at the end of the run. Additional 20 g analysis samples were taken from both sides at 80 minute intervals during the two stages of operation.

The MDEA feed samples were quantitatively analyzed for total MDEA by gas chromatography, Na$^+$ ion concentration by atomic absorption and a titration method was used to determine the concentration of MDEA tied up as HSS. MDEA-HSS concentration was determined as weight percent MDEA and does not account for the anionic part. Water transport across the membrane was determined by carefully measuring the amount of NaOH solution added and removed at each stage.

First order separation rates for each run were calculated using a least squares curve fitting program from HSS concentration data corrected for water transport.

Figure 1:
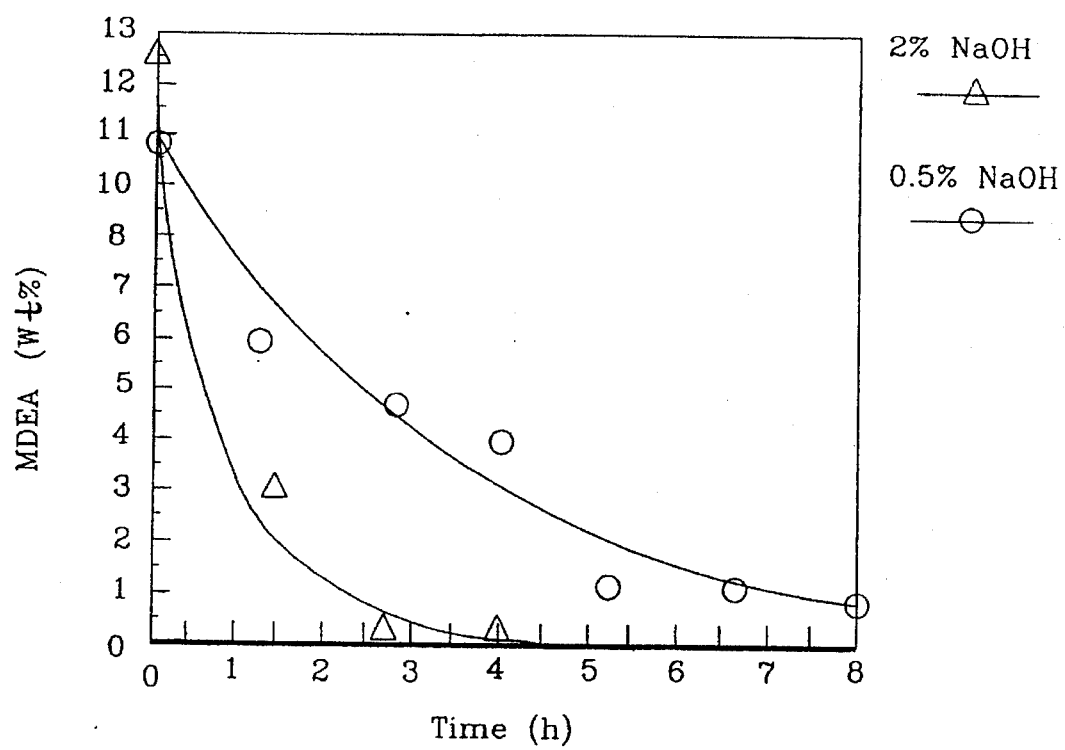
FIG. 1 graphically illustrates a plot of weight percent reduction of methyldiethanolamine (MDEA) tied up as heat stable organic amine salts versus time of operation of a dialysis cell at 34° C. with a 1200 ml charge for both two weight percent and 0.5 weight percent sodium hydroxide solution.

The MDEA-HSS separation results are shown in FIG. 1 with the concentration of MDEA as HSS in terms of weight percent. The curve (Δ-Δ-Δ) for two percent by weight NaOH includes only data for the first stage of the batch run (Example 10) because analysis at the end of stage 1 indicated less than 0.1 weight percent MDEA-HSS, the detection limit for the method used. Equations for the curves have the form:

$$[MDEA-HSS]=Ae^{-kt} \quad (I)$$

wherein [MDEA-HSS] represents the solution weight percent concentration of MDEA tied up as HSS, t is dialysis time in hrs, A is the coefficient at t=0 and k is the time constant in (hrs)$^{-1}$. Coefficients A, k and R$^2$ for the curves in FIG. 1 are shown in Table 3.

TABLE 3

| Example | Curve | A (wt % MDEA as HSS) | K (hrs)$^{-1}$ | R$^2$ |
|---|---|---|---|---|
| 10 | (Δ-Δ-Δ) 2 wt % NaOH | 11.891 | 1.339 | 0.937 |
| 11 | (0-0-0) 0.5 wt % NaOH) | 10.956 | 0.364 | 0.896 |

The time coefficient for the two weight percent base solution is nearly four times the coefficient for the 0.5 weight percent base solution.

EXAMPLE 12

A large scale batch process is designed to recover 3785 liters (1000 gallons) per day of spent MDEA absorbent containing 11 weight percent MDEA-HSS. The base solution comprises 3785 liters of two weight percent NaOH and the design criterion is 0.1 weight percent final concentration of MDEA-HSS. Using the results from Example 10, 1 m$^2$ surface area of membrane can separate 0.1922 l/min. The calculated membrane area required is 13.675 m$^2$.

EXAMPLE 13

A continuous process is designed to separate MDEAHSS from spent absorbent solution. Solving equation (I) for a steady state MDEA-HSS concentration of 2 weight percent in the MDEA stream exiting the dialysis unit gives t equal to 1.33 hr. Differentiating (I) for time and solving at t=1.33 gives an MDEA mass recovery rate of $$-0.0268 \; g_{MDEA-HSS}/g_{feed}/hr. \quad (II)$$

Mass recovery of MDEA per unit area the membrane may be calculated from (II) and Example 10 to be −1236.8 g$_{MDEA-HSS}$/hr-m$^2$. For an accumulation rate of 0.91 kg-mole MDEA (mol. wt =119) per day or 4500 g/hr in a typical process, a surface area of 3.64 m$^2$ is required for a continuous process. The surface area requirements for both the batch and continuous processes are reasonable and economical for the purpose of recovering free MDEA from the heat stable MDEA salts in absorbent solutions used to abate acid gases in gas streams.

EXAMPLE 14

Dialysis separation was performed on a 4-HEP solution containing heat stable amine salt (HSS) in the dynamic countercurrent cell described in Examples 5–11 to determine the separability of 4-HEP from the HSS. The feed solution was made up of a ten percent by weight 4-HEP aqueous solution and 0.612 moles/liter H$_2$SO$_4$ and the base solution used was a 3.0 weight percent NaOH. The HSS in this example comprised SO$_4^=$ from sulfuric acid.

The run was begun by charging the feed tank with 1200 g feed solution and the base tank with 1200 g hydroxide with three g samples taken initially from each tank for analysis. Process temperature and pressure for each stream were identically maintained at about 49° C. and between about 28 to 55 kPa gauge (4 to 8 psig).

To simulate a two stage caustic process, the first batch stage was operated for a 3 hr time period after which the spent caustic solution was removed and refreshed by new solution of the same concentration and weight as initially used, then the "second" stage was operated for three hours to complete the run. Samples were taken for analysis from both sides at the time of refreshment and at the end of the run. Additional 3 g analysis samples were taken from both sides at 60 minute intervals during the two stages of operation.

The 4-HEP and hydroxide samples were quantitatively analyzed for bisulfate ion concentration (SO$_4^=$) by ion chromatography. Data is plotted in FIG. 2 in terms of total moles HSS present in the feed solution vs. time in hours and was corrected for water transport across the membrane as well as sampling losses. Water transport across the membrane was determined by carefully measuring the amount of NaOH solution added and removed at each stage.

Figure 2:
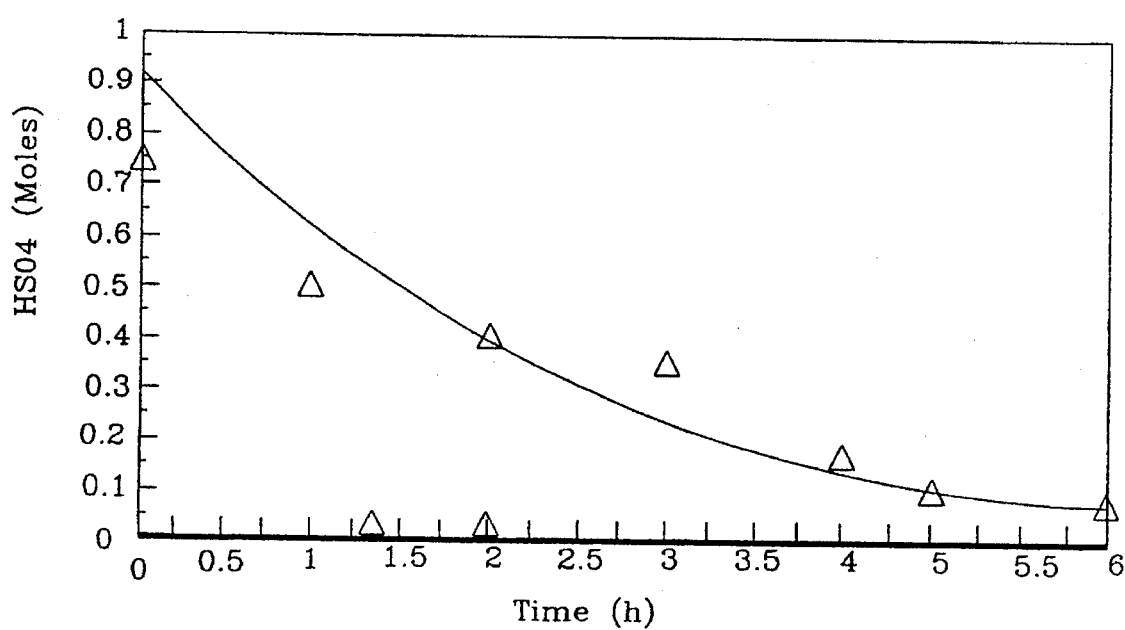
FIG. 2 graphically illustrates reduction of bisulfite ($HSO_4-$) from a solution of 4-(2-hydroxyethyl)-2-piperazinone/bisulfite versus time of operation of a dialysis cell at 49° C. with three weight percent hydroxide solution.

A first order least squares regression was fit to the data resulting in the curve shown in FIG. 2 with an R$^2$ (coefficient of determination) of 0.9438 indicating a good fit. The general equation has the form:

$$\text{Total Moles of SO}_4^= = Ae^{-kt}$$

wherein t is dialysis time in hrs, A=0.9256 (total moles SO$_4^=$ at t=0) and k=0.4958 (time constant in (hrs)$^{-1}$).

The data show that the bisulfate concentration had been reduced by 95.3 percent in six hours. This separation rate is comparable to that seen in the Donnan dialysis of MDEA/HSS indicating that Donnan dialysis is economical for absorption processes based on 4-HEP as well as MDEA.

EXAMPLE 15

In this example, the dialysis was performed on 4-(2-hydroxyethyl)-2-piperazinone (4-HEP) solution in the dynamic countercurrent cell used in Examples 5–9. Flow rates were maintained at 1 liter per minute and temperatures were controlled at 25° C. The dialysis evaluation was performed on an R-1030 membrane using 1200 grams of the 4-HEP solution and 1200 grams of a four percent by weight sodium bicarbonate (NaHCO$_3$) solution as the base dialyzing solution. The 4-HEP solution contained ten weight percent 4-(2-hydroxyethyl)-2-piperidine (4-HEP), 0.114 moles of SO$_3^{-2}$ from H$_2$SO$_3$, and 0.222 moles of SO$_4^{-2}$ from H$_2$SO$_4$. In this particular example sulfuric acid (H$_2$SO$_4$) makes a heat stable salt with the 4-HEP while H$_2$SO$_3$ combines with 4-HEP to make a non-heat stable salt. In this particular example we are interested in showing the ability to remove HSS as SO$_4^{-2}$ using bicarbonate ion as the base dialyzing medium instead of hydroxide ion.

Five 20 gram sodium bicarbonate samples were taken over a five hour period of time at one hour intervals. These were analyzed by an ion chromatography (IC) system from Dionex for SO$_3^{-2}$ and SO$_4^{-2}$ ions. Results in Table 3 show the total moles of SO$_3^{-2}$ and SO$_4^{-2}$ ions accumulated in the sodium bicarbonate solution along with the percent removal of each species from the 4-HEP solution. The data are corrected for water transport and sample losses.

TABLE 3

EXAMPLE 15

| Sample Time | $SO_3^{-2}$ moles | $SO_4^{-2}$ moles | $SO_3^{-2}$ Percent Removal | $SO_4^{-2}$ Percent Removal |
|---|---|---|---|---|
| 0 hours | 0.001 | 0.002 | 0.92 | 0.79 |
| 1 hour | 0.019 | 0.043 | 16.72 | 19.48 |
| 2 hours | 0.037 | 0.069 | 32.74 | 31.13 |
| 3 hours | 0.055 | 0.086 | 47.74 | 38.96 |
| 4 hours | 0.061 | 0.104 | 53.58 | 46.90 |

Evaluation of the results in Table 3 show that bicarbonate and carbonate ions are suitable substitutes for hydroxide ions in the removal of heat stable salts.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A method using Donnan exclusion principles wherein an ion exchange occurs across a membrane occurs for converting heat stable organic amine salts to a thermally regenerable amine absorbent for acid gases, comprising the steps of:

(a) feeding an organic amine absorbent solution containing greater than 0.5 percent by weight of heat stable organic amine salts into a first compartment of a dialysis cell whereby said organic amine salts ionize to form heat stable salt anions and organic amine portions, wherein said organic absorbent solution in said first compartment is separated from an aqueous base dialyzing solution in a second compartment of the dialysis cell by a membrane;

(b) inducing an exchange of heat stable salt anions in said first compartment for hydroxyl anions in said second compartment by maintaining an effective hydroxide concentration differential between said compartments to regenerate free amine in said first compartment without the use of electrical potential to drive the ion exchange; and (c) withdrawing absorbent solution from said first compartment having a reduced heat stable organic amine salt concentration and an enhanced free amine concentration.

2. The method of claim 1, wherein the amine component of said organic absorbent solution concentration ranges from greater than about 0.5 percent by weight to less than 100 percent by weight.

3. The method of claim 1, wherein the amine component of said organic absorbent solution concentration ranges from about 5 percent by weight to 70 percent by weight.

4. The method of claim 1, wherein the amine component of said organic absorbent solution concentration ranges from about 10 percent by weight to 60 percent by weight.

5. The method of claim 1, wherein said organic amine salt that is tied up in the heat stable salt ranges from about 0.5 to 10 percent by weight of the solution.

6. The method of claim 1, wherein said organic amine salt that is tied up in the heat stable salt ranges from about 2 to 5 percent by weight of the solution.

7. The method of claim 1, wherein said base solution is substantially free of amine and has a concentration that ranges from about 0.05 to about 20 percent by weight.

8. The method of claim 1, wherein said base solution is substantially free of amine and has a concentration that ranges from about 0.1 to about 10 percent by weight.

9. The method of claim 1, wherein said base dialyzing solution is selected from the group consisting of hydroxides, bicarbonates, carbonates, or mixtures thereof.

10. A method using Donnan exclusion principles wherein an ion exchange across a membrane occurs for abating acid gas in a gas stream, comprising the steps of:

(a) contacting a gas stream containing said acid gas with an absorbent solution comprising an aqueous organic amine compound, wherein said acid gas is absorbed by said absorbent producing an acid rich organic amine absorbent solution and wherein a portion of said absorbent forms organic amine heat stable salts and a portion forms a non heat stable acid fraction;

(b) thermally stripping the non heat stable acid fraction from the acid rich absorbent solution to produce an acid lean organic amine absorbent solution containing organic amine heat stable salts;

(c) feeding at least a portion of said acid lean absorbent solution containing greater than 0.5 percent by weight of said absorbent heat stable salts into a first compartment of a dialysis cell, wherein said acid lean absorbent solution in said first compartment is separated from an aqueous base solution in a second compartment by a membrane;

(d) exchanging organic amine heat stable salt anions in said first compartment for hydroxyl anions in said second compartment by maintaining an effective base concentration differential between said compartments to regenerate free organic amine absorbent in said first compartment without the use of electrical potential to drive the ion exchange;

(e) withdrawing the acid lean absorbent solution from said first compartment which has a reduced heat stable salt concentration and an enhanced free amine concentration; and (f) recycling said absorbent solution having enhanced free amine concentration to said contacting step.

11. The method of claim 10, wherein the amine component of said organic absorbent solution concentration ranges from greater than about 0.5 percent by weight to less than 100 percent by weight.

12. The method of claim 10, wherein the amine component of said organic absorbent solution concentration ranges from about 5 percent by weight to 70 percent by weight.

13. The method of claim 10, wherein the amine component of said organic absorbent solution concentration ranges from about 10 percent by weight to 60 percent by weight.

14. The method of claim 10, wherein said organic amine salt that is tied up in the heat stable salt ranges from about 0.5 to 10 percent by weight of the solution.

15. The method of claim 10 wherein said organic amine salt that is tied up in the heat stable salt ranges from about 2 to 5 percent by weight of the solution.

16. The method of claim 10, wherein said base solution is substantially free of amine and has a concentration that ranges from about 0.05 to about 20 percent by weight.

17. The method of claim 10, wherein said base solution is substantially free of amine and the concentration ranges from about 0.1 to about 10 percent by weight.

18. The method of claim 10, wherein said base solution is selected from the group consisting of hydroxides, bicarbonates, carbonates, or mixtures thereof.

19. The method of claim 10, wherein said amine acid gas absorbent comprises an alkanolamine.

20. The method of claim 10, wherein said amine acid gas absorbent comprises a substituted or unsubstituted 5 to 7 member heterocyclic amine.

21. The method of claim 10, wherein said amine is selected from the group consisting of MEA, MDEA, and 4-(2-hydroxyalkyl)-2-piperazinone.

* * * * *